United States Patent [19]
Harvey

[11] 3,755,792
[45] Aug. 28, 1973

[54] DIGITAL DATA STORAGE SYSTEM

[76] Inventor: Norman L. Harvey, 381 Ocean Ave., Marblehead, Mass.

[22] Filed: Mar. 26, 1971

[21] Appl. No.: 128,449

[52] U.S. Cl. ........................ 340/173 R, 340/173 TP
[51] Int. Cl. ............................................ G11c 13/00
[58] Field of Search .............. 340/174.1 A, 174.1 G, 340/174.1 H, 347 DD, 173 R, 146.1 F; 179/100.4 R

[56] References Cited

UNITED STATES PATENTS

| | | | |
|---|---|---|---|
| 2,547,009 | 4/1951 | Huston et al | 179/100.4 R |
| 3,320,598 | 5/1967 | Star | 340/146.1 F |
| 3,376,566 | 4/1968 | Coccagna | 340/174.1 G |
| 3,537,084 | 10/1970 | Behr | 340/174.1 A |
| 3,562,724 | 2/1971 | Adler et al | 340/174.1 H |
| 3,662,363 | 5/1972 | Chertok | 340/173 R |

OTHER PUBLICATIONS

Publication I, "Correlative Level Coding" IEEE Spectrum, pp. 104–115, Feb. 1966.

*Primary Examiner*—James W. Moffitt
*Attorney*—Thomas C. Stover, Jr.

[57] ABSTRACT

Method and apparatus for storing binary digital data on a storage medium such as a record disk, monaural or stereo, is provided. The data is converted to electrical signals which are encoded to 2 levels or 3 level signals, which signals are then inscribed upon the storage medium for future playback. Self clocking and error detection are built in the capabilities of the system. DC and low frequency components can also be handled.

35 Claims, 12 Drawing Figures

A

B

INVENTOR
NORMAN L. HARVEY
BY Thomas C. Stover Jr.
ATTORNEY

DIGITAL DATA STORAGE SYSTEM

FIELD OF THE INVENTION

This invention relates to digital data storage and recovery, particularly high density storage of digital data for ready playback from a storage medium.

THE PRIOR ART

The handling, manipulation, and processing of digital data for all its manifold business, scientific, process control, and other purposes requires a variety of data storage means. Computers have the capability of storing limited amounts of data internally and this storage is usually used to store data that is involved in the active processing by the computer where fast random access it essential. Because of capacity limitations and cost of internal storage, and to have means to bring data to and take data away from the computer, a variety of peripheral storage equipments have been developed. In most common usage are magnetic disk packs and tapes, punched paper tape, and punched cards.

In some applications it is necessary to store large amounts of slowly changing data by methods that permit efficient and low cost duplication of many copies, and simple utilization of these copies by low cost and widely dispersed terminals. Examples of such applications are the storing of negative or derogatory credit card numbers at off-line terminals where customer credit is to be checked, the storing of standard tables and schedules for business purposes, distribution of rate chart revisions, distribution of data from scientific experiments, distribution of inventory information and the like.

Magnetic storage on disk packs or on tape offers large storage capacity, but equipment utilizing these means is relatively expensive, and duplication of copies must be done essentially one or a few at a time, and hence copying is expensive. High capacity tape systems, moreover, do not permit rapid access to data stored at some distance down the tape. Paper tape storage is less expensive, but copying again requires an essentially one at a time process. In addition paper tape can be read out only at slow rates, and is not durable. Punched cards have most of the same limitations, and also are so particularly slow in read-out that it is customary to first transfer their data to intermediate storage on magnetic tape.

A phonograph disk offers features that meet the criteria for this form of storage exceedingly well. It possesses inherently high storage capacity, data can be accessed at random quite rapidly, data can be read out at rates comparable to those of magnetic tape, and copies can be made in very large volume at very low cost by long established techniques. Previous attempts to utilize this medium, while promising, have required complicated processing of the input data signals by expensive precision equipment in order to achieve in practive the theoretically high storage capacity of phonograph disks.

The present invention discloses signal forms and recording means that can be accomplished by substantially simpler and lower cost processing equipment, that are in a form very compatible with stnadards employed for other data handling equipment with which it will frequently interconnect, and that utilize the natural characteristics of the disk more effectively to achieve even larger storage capacity. Since this storage capacity is achieved by simple and low cost means, in those applications not requiring large capacity, the methods can be employed to store data efficiently at lower density as a compromise to obtain other advantages such as faster random access, higher reliability, lower cost components, etc. A further feature is a built-in ability to detect the presence of certain types of errors in recording or play-back.

Phonograph recording is customarily accomplished by utilizing a lathe to cut an approximately 90° V-shaped continuous spiral groove in a lacquer coating on a flat metallic disk. Plating techniques, including positive and negative pattern reversals, are used to build up from the lacquer a metallic negative that is then used as the die in a plastic molding press to produce a large number of copies. Monaural recording of speech and music is customarily accomplished by modulating the cutting stylus by electrical means with the tones being recorded in undulations in a direction lateral to the direction of the spiral groove. Stereo recording is usually accomplished by modulating the stylus path for one stereo channel in a direction normal to one wall of the V-groove, and by modulating the stylus path for the second stereo channel in a direction normal to the second wall of the V-groove. Since these two modulations are orthogonal in direction (at 90° to each other) they are separable at play-back.

Since the electrical output of the playback transducer is proportional to the velocity of the stylus in a plane normal to the groove direction, phonograph recording and reproduction is customarily done on a constant velocity basis; that is, ideally, equal amplitudes of signal inputs will be recorded as equal stylus velocities regardless of frequency, and will then produce equal transducer electrical outputs. The lateral groove velocity for a sinusoidal signal input may be expressed as, $$V_L = 2\,\pi fD \cos(2\,\pi ft)$$

where $V_L$ = the instantaneous lateral stylus velocity $f$ = the temporal frequency of the groove modulations $D$ = the peak lateral displacement of the stylus The peak stylus velocity $V_L$ may be seen to be, $$V_L = 2\,\pi fD$$

In order to maintain constant peak velocity as the frequency $f$ decreases, it is necessary to increase in inverse proportion the maximum displacement D. It is obvious that displacement can not be increased without limit, and it becomes increasingly more difficult to record and reproduce very low frequencies, and a DC component can not be reproduced at all. For voice and music recording, industry standards stipulate a compromise of 6db per octave roll off at the lower frequencies and a complementary enhancement or reconstituting of the low frequency components in the playback equipment. Previous methods of digital data recording on this medium have employed methods of eliminating low frequency and DC components by employing either carrier modulation techniques or complex forms of signal symbol generation.

The recording of high frequencies is eventually limited by other factors, with the dominant limitation relating to groove geometry being that of tracing error. Since the stylus must have a point of finite size, a few tenths of a mil in diameter being typical, it cannot accurately follow groove undulations where the radius of curvature of the undulations are less than the stylus radius. Small radii of curvature result when rapidly changing high frequency signal components are present and in that case an error in tracing the groove wall appears.

Accordingly, there is a limit to the amount of information that can be stored on a disk after which distortion and intersymbol interference occur and data storage on a record of above 500 bits per linear inch has heretofore proved difficult to attain. There is therefore a need and a market for a new method, product and apparatus for improved digital data storage and recovery on a storage medium that has heretofore been available.

Accordingly, there has now been discovered a method and apparatus for storage of digital data in either monaural of stereo form on a storage medium eg. a record disk, by conversion of the data in a highly advantageous waveform or signal configuration. High density storage of digital data is provided in 2-level and 3-level embodiments. A novel data recovery method is provided. Rapid and facile access to stored data is provided. Data is converted to waveform signals that have in addition to high storage capacity, self-clocking and error detection characteristics upon recovery. Means are also provided for handling the DC and low frequency components when present. A new record embodiment is provided for digital data storage.

SUMMARY

Broadly, the present invention provides a method for storing digital data on a record medium comprising converting the digital data to a baseband electrical signal of the form of a plurality of amplitude levels each of which is assigned a logical data significance, and inscribing the signal, including any significant direct current and low frequency components thereof, onto the record medium as an undulating groove having lateral displacements along at least one axis normal to the general path of the groove where said displacements correspond to the amplitude levels of said electrical signal. By "lateral displacements" is meant displacement of a groove along at least one axis normal to the general path of groove, i.e. normal to the longitudinal path of the groove including displacements along axes vertical and horizontal with respect to the general path groove.

In another embodiment, a pair of encoded baseband electric signals are inscribed in the two channels of a stereo groove as clocking complements of each other. Other embodiments of the invention will become apparent from the following description.

By clocking complements is meant related signal streams which when read together provide a signal in each and every time interval. These signals can be employed to syncronize a clock and no other clock signal is needed. For example, NRZ1 and NRZO are clocking complements, note FIGS. $3C_1$ and $3C_0$, discussed below, wherein said complements are shown and note output signals $3E_1$ and $3E_0$ wherein a pulse appears at every time interval. Other clocking complements are double encoded NRZ1 and double encoded NRZO, FIGS. $11D_1$ and $11D_0$. An NRZ signal starting at 1 and an NRZ signal simultaneously starting at 0 can be complements but not necessarily clocking complements.

DESCRIPTION

The invention will become more apparent from the following detailed specification and drawings in which.

Figure 1:
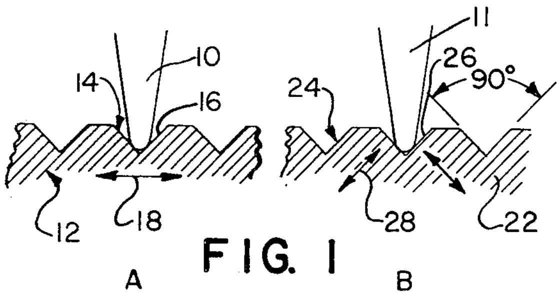
FIG. 1A is a sectional elevation schematic of a monaural recording system.
FIG. 1B is a sectional elevation schematic of a stereo recording system.

Referring now to the drawings, geometric features of monaural and stereo playback in the record groove are shown in FIGS. 1A and 1B respectively. At playback a stylus 10 rides in the groove 14, having sloping sides 16, the groove having been cut or molded in the surface of a record disk 12 as shown in FIG. 1A. The stylus 10 traces the lateral undulations along axis 18 as it follows the groove 14 as shown in FIG. 1A. The stylus 10 is mechanically linked to a transducer or cartridge (not shown) that converts the rate of change of the stylus lateral position into an electrical signal.

In a stereo system, a stylus 11 rides in the groove 24 having orthogonally pitched sides 26, the stereo groove 24 having been cut or molded in the surface of record disk 22 as shown in FIG. 1B. The stylus 20 traces the undulating path, wherein arrows 28 show the orthogonal axes of the pair of stereo channels in groove 24 as illustrated in FIG. 1B. The stylus is mechanically linked to a transducer or cartridge and the two orthogonal directions of motion 28 are separately converted by a suitable transducer to produce electrical signals in each of the two stereo channels.

Figure 2:
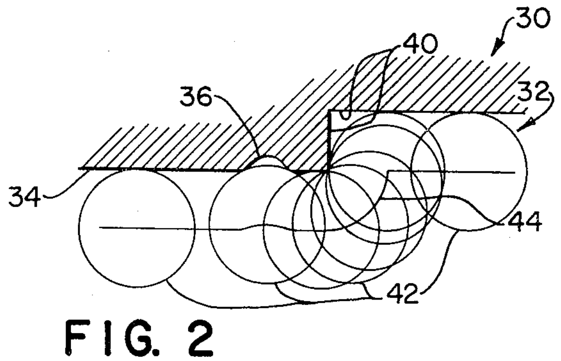
FIG. 2 is a section plan schematic of a stylus path in a record groove.

As discussed above, tracing error occurs where a stylus can not accurately follow groove undulations where the radii of curvature of the undulations are less than the radii of the stylus. Thus, as shown in FIG. 2, where the stylus 42 shown in phantom at several positions attempts to trace groove 32 along groove wall 34 of record 30, the stylus 42 cannot trace small radius undulations 36 nor step function displacement 40 with accuracy. The tracing error is readily seen by noting the difference between the profile of groove wall 34 and the path 44 described by stylus 42 and considerable distortion is evident.

A stream of digital data, represented either by signal pulses indicating Marks or Ones, and the absence of pulses indicating Spaces or Zeros; or by rectangular signal patterns in a NRZ (non return to zero) form presents certain requirements to the recording medium. Since Ones and Zeros have equal probabilities of being present in each timing interval, a stream of data can have low frequency components including DC. The storage that is possible is dependent upon the high frequency recordings characteristic of the medium. In an article by H. Nyquist, titled "Certain Factors Affecting Telegraph Speed", *Bell System Technical Journal*, Volume 3, pp. 324–346, April 1924, Mr. Nyquist stated that the theoretical upper limit of data transmission over an idealized transmission telephone line is 2 bits per cycle of bandwidth of the transmission line when employing two signaling levels. In a more recent article "Correlative Level Coding For Binary Data Transmission", *IEEE Spectrum*, pp. 104–115, February 1966, Adam Lender has shown methods of achieving this theoretical rate over practical telephone lines by employing signal precoding and multi-level transmission.

Since data storage implies playback later in time and oftentimes at remote locations, it is further necessary to record clock or timing information on the medium or to be able to derive it from the data. The clock signal must be separable or derivable from data at play-back with a minimum impairment of its precise phase-to-data timing relationship. A portion of the storage capacity of the medium must be dedicated to this clock signal and, thereby may reduce the data storage capacity.

Figure 3:
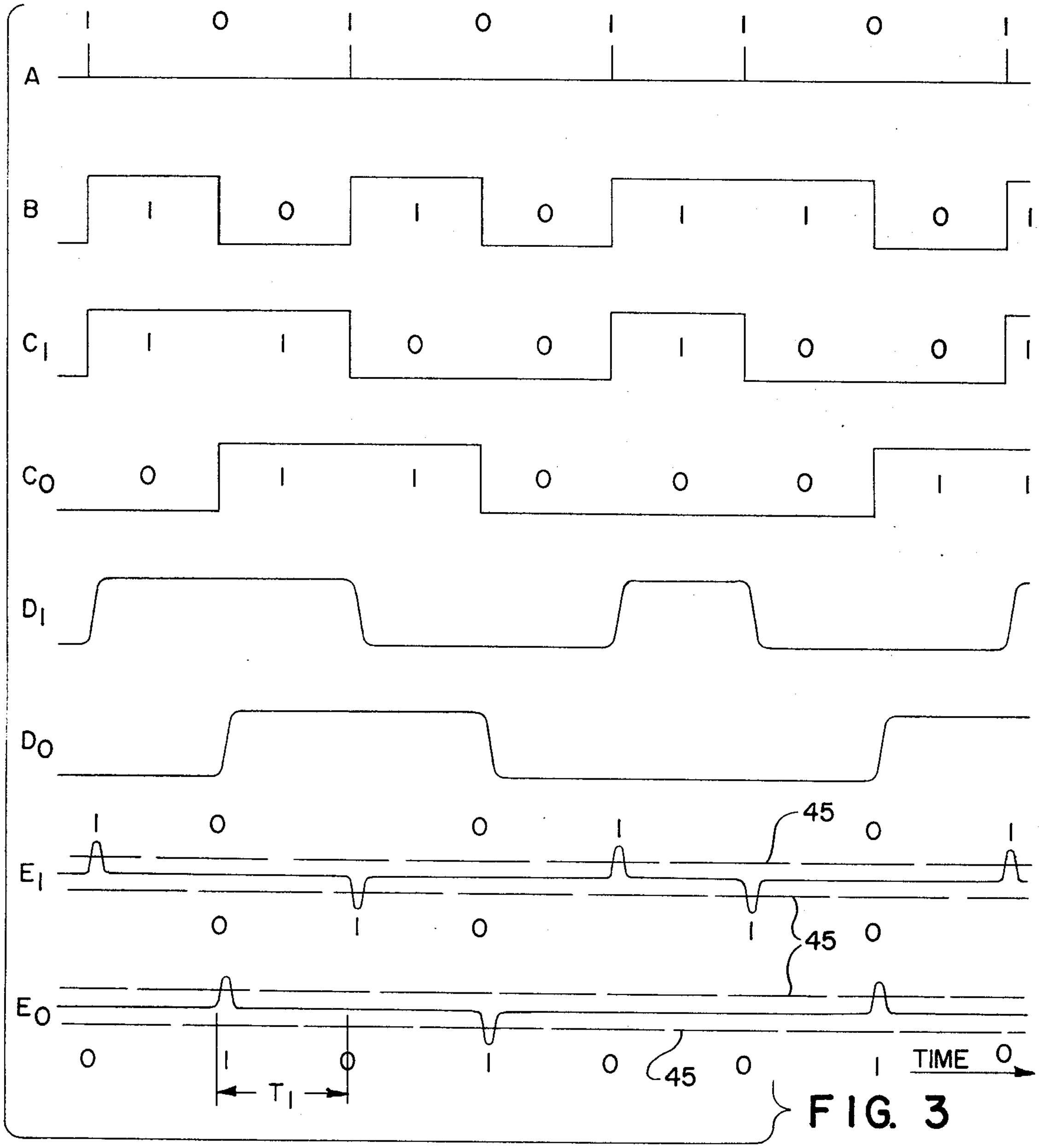
FIG. 3 shows binary signal waveforms embodying the present invention.

A stream of digital data eg. in the form of pulses or marks and spaces, representing Ones and Zeros such as shown in FIG. 3A is received from a conventional transmission source. The data can be converted to a rectangular signal pattern for storage eg. intermediate storage on a magnetic tape or more permanent storage on a record disk. The rectangular signal pattern is suitably an NRZ signal as shown at FIG. 3B and this signal is suitably inscribed on a record storage medium as described below according to the present invention. A timing signal can be subsequently derived from the NRZ signal during the data recovery stage or playback. Alternately, and preferably, a signal can be added to the NRZ signal and inscribed on the record medium. The clocking signal and the NRZ signal can be inscribed in the same groove in a monaural record disk by frequency multiplying methods or the clocking signal and the NRZ signal can be inscribed on separate channels of the same stereo groove for increased data storage capacity compared with the monaural groove storage thereof.

Additionally, the digital data can be converted to an NRZ1 rectangular signal pattern as shown in FIG. 3C, and/or an NRZO signal as shown in FIG. 3C. These NRZ0 and NRZ1 signals are derived from the original digital data stream, FIG. 3A, by methods well known in the art.

Figure 4:
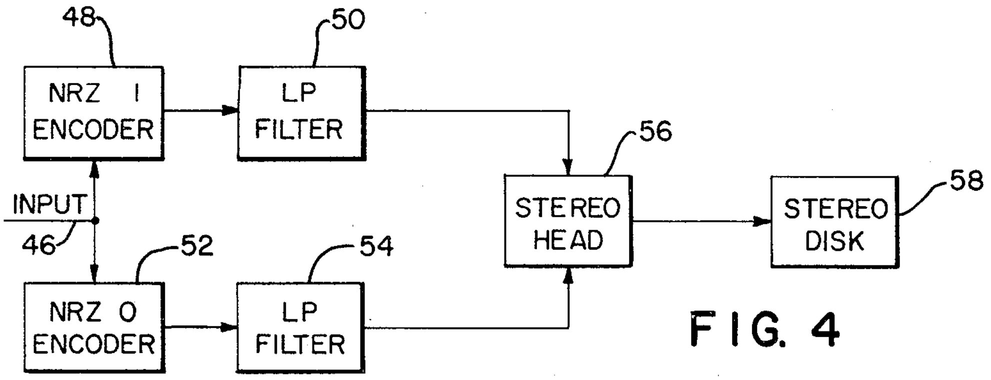
FIG. 4 is a block schematic of a data recording system embodying the invention.

The system employed to record the data in a first preferred embodiment of the invention is illustrated in block schematic form in FIG. 4. Incoming data is received on input channel 46, thence directed along two separate paths to NRZ1 encoder 48 and NRZO encoder 52, where the data is encoded respectively to an NRZ1 signal and an NRZO signal. The NRZ1 signal and the NRZO signals are then passed through identical low pass filters 50 and 54 to cut off noise and extraneous signals from said signals conveniently above a frequency determined by the bit rate of the data. Said signals in the two channels are then imposed upon the orthogonally related driving circuits and coils of a conventional stereo cutting head 56. This head cuts the complementarily related signals into the stereo tracks of the disk 58.

In this embodiment of the invention the signals in the two channels are both at baseband and may contain very low frequency and DC components. Although it is correct that a DC component can not be reproduced by phonograph recording and that it is impractical to record the very low frequencies, that limitation is caused by the velocity sensitive characteristic of the play-back transducer. The other elements of the system, including the entire groove cutting apparatus, the disk itself, and all of the receiving system after the transducer, can, within the scope of the present invention, be direct coupled so as to preserve DC or low frequency components that they may be called upon to handle. It is to be understood, therefore, that, according to the present invention, the cutting head driving system may be direct connected so that direct current can be maintained in the cutter head coils. In this embodiment of the invention the basic physical function of the cutting operation is that of switching the cutting stylus between two extreme lateral positions in accord with the rectangular waveforms input to the system. The cutting is done with a constant displacement characteristic rather than the constant velocity characteristic used in the conventional recording of voice or music. The cutting stylus displacement is made proportional to signal amplitude, which in this embodiment is between two extreme binary positions only. The equalization required in conventional voice and music recording is not necessary.

At data rates so slow as to be considerably below the upper frequency bounds of the system, the cutting stylus will cut a groove whose undulations will be a close replica of the signal input to the cutting head, and this groove will be faithfully traced out by the play-back stylus. In FIG. 3D, is illustrated the displacement pattern of the V-groove as it is cut under the control of the NRZ1 signal depicted in FIG. 3C, assuming a slow data rate. In this example, this is one channel of a stereo pair, and the axis of displacement is perpendicular to one wall of the V-groove at 45° to the disk surface as illustrated in FIG. 1B. The complementary NRZO signal shown at FIG. $3C_0$ is cut in a groove wall in the contour depicted at FIG. $3D_0$.

A similar inscribing system to that described above is provided for inscribing NRZ or NRZ and a clock signal in a monaural or stereo record disk within the scope of the present invention.

Figure 5:
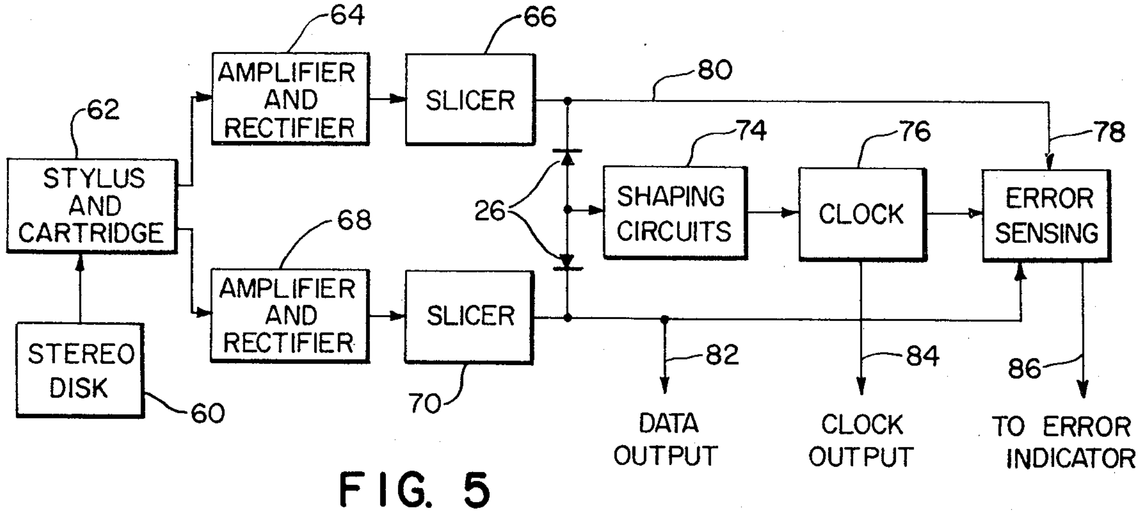
FIG. 5 is a block schematic of a data recovery system embodying the invention.

The data is recovered from the disk storage medium by the play-back system illustrated schematically in FIG. 5. The stereo disk 60 on which the data was previously recorded is mounted on a conventional turntable and rotated at a selected velocity. A stylus coupled to a stereo cartridge 62 tracks the undulations of the continuous spiral groove on the disk. As is known in the art, though there is but a single stylus and a single V-groove, the displacement from the mean location of the two walls of the 90° V-groove provide two orthogonally related mechanical motions which are separated into two independent signal channels by the cartridge 62.

Since the cartridge transducer produces an output proportional to the lateral velocity (time rate of displacement) of the stylus, the signal appearing on each of its two pairs of output terminals is proportional to the changes in the lateral displacement of the groove on the disk. In mathematical terms the cartridge outputs are time derivatives of the displacement curves of the two groove wall channels. The cartridge performs a differentiating function in this mathematical sense.

In FIG. $3E_1$ is illustrated the output signal derived from the groove contour shown in FIG. $3D_1$ which in turn was a recording at slow rates of the NRZ1 signal of FIG. $3C_1$. The second stereo channel produces the output shown at FIG. $3E_0$. If it were physically possible to cut a perfectly rectangular pattern of groove undulations into a disk and then trace them precisely with an idealized stylus linked to a cartridge with infinite response capabilities, the output from each channel would be an infinitely narrow spike or impulse at each displacement transition. In a practical system instantaneous transition cannot be cut nor traced, and the output becomes a series of impulses of finite width.

Returning to the recovery of play-back system illustrated in FIG. 5, the output signals from the two stereo terminal pairs of cartridge 62 are amplified in identical amplifiers 64 and 68. It is convenient to apply full wave rectification as a part of this function inverting either the positive or negative pulses of FIGS. $3D_1$ and $3E_0$, so that only a single level of slicing need be provided. The slicers 66 and 70 are set to provide signal thresholds 45, as shown in FIGS. $3E_1$ and $3E_0$ typically at the 50 percent amplitude level of the signals input to them. The outputs of slicers 66 and 70 in FIG. 5 consist of pulses exceeding this threshold level, that of one slicer being the signal derived from the NRZ1 channel, and the other being the signal derived from the NRZO Channel. Examination of FIG. 3 reveals that FIG. $3E_1$ is a faithful recovery of the data input as shown at FIG. $3A_1$ and FIG. $3E_0$ is a reproduction of the signal complementary to FIG. 3A.

The stream of pulses on either slicer output line contain sufficient information to reconstitute the original data that was stored. In FIG. 5, the output of slicer 66 is shown as providing the output on Data output line 82. Assuming that this channel corresponds to the original NRZ1 channel, the pulse train will have the form of that shown in FIG. $3E_1$ after the negative pulses have been inverted. It can be seen that this pulse train is a faithful reproduction of the data stream of FIG. 3A. Output DAta Line 82 can be connected to a computer, to display terminal, or to any other using equipment as desired.

Alternatively, the complementary signals from Slicer 66 could have been taken as the Data Output as at 80, in this case producing a data stream representing the complement of FIG. 3A.

Examination of FIGS. $3E_1$ and $3E_0$ shows that in each timing interval $T_1$, there is always a signal pulse present from one channel or the other, but never from both simultaneously. This condition exists for all pattems of signal input and results from the fact that one channel records a change for each logical One input, and the other records a change for each input of a logical Zero. In a binary system where only two states exist, it can be seen that there is a response to each state in one channel or the other but never simultaneously in both.

This characteristic can be used to obtain timing or clock signals. The outputs from Slicers 66 and 70 are combined through isolating diodes 26 to provide an input to Shaping Circuit 74. The input to 74 is a stream of pulses, one and only one in each and every timing interval. These pulses are shaped, adjusted appropriately in time phase, (both by well known techniques) and then used to synchronize Clock 76. The clock signal is output on Clock Output line 84, in conjunction with the Data Output 82, to the using equipment or device.

This same signal characteristic can be used also as means of error detection. The outputs from Slicers 66 and 70 can be connected to Error Sensing Circuit 78 in conjunction with a timing signal from Clock 76 to examine in each timing interval any occurrence of no pulses at all or of simultaneous pulses from both channels. The occurrence of either indicates an error in one channel or the other, but not in both. The occurrence of an error can be signalled on Error Line 86.

The time derivative of the recorded DC component is zero and the time derivative of any low frequency or slowly changing component is very small and will be below the slicing threshold at play-back. In as much as all of the information is stored in the displacement transitions of the groove, it is all recovered in this velocity sensitive system and the unneeded DC and low frequency components are conveniently discarded.

By way of further illustration of this point, consider the extreme condition where the data signal is an infinitely long string of zeros, interrupted only by a single logical One therein. The NRZ1 encoding, storage, and recovery of this particular data signal is depicted in both FIGS. 6A and 6B. At recording, a signal of this form requires displacement of the cutting stylus to one extreme position, as illustrated at 96 in FIG. 6B, then an interruption for one timing interval by an excursion over to the other extreme position 98 and then back to 96 after one isolated timing interval. Obviously a large DC component exists as depicted at 100. The stylus is maintained in the extreme initial and final positions for plus and minus infinite time by the steady state application of DC current to its driving coils.

Figure 6:
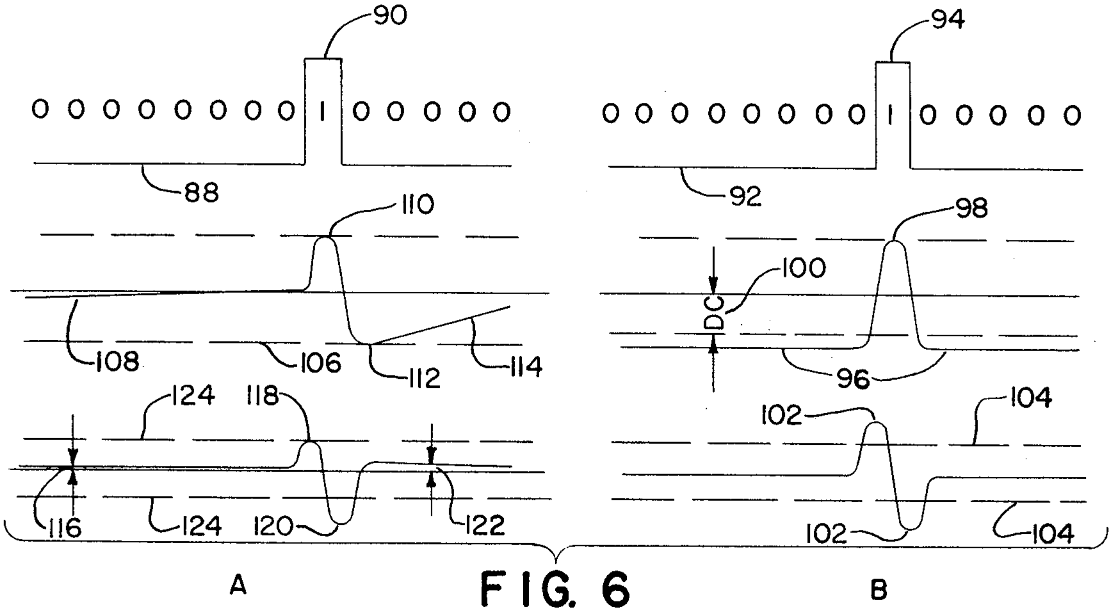
FIG. 6 illustrates recording and recovery wave forms having DC components.

The play-back system responds only to this over and back excursion, producing the single positive and single negative pulses 102 of FIG. 6B, discarding the DC components in the process. It can be seen that with the two pulses 102, which are read at the slicing levels 104, all of the original data of wave 94 has been recovered. Intuitively, it can be appreciated that the original NRZ1 encoding instruction, "change at one" is fully adaptable to a storage and recovery system that specifically senses and reproduces the "changs at one".

The results of cutting a groove by apparatus not capable of maintaining a steady state DC level in the driving coils of the cutting head is depicted in FIG. 6A. As the current level in the steady state extreme prior to the single NRZ1 pulse declines to zero, the cutting stylus declines from an initial extreme at 106 to its mean (neutral) position as depicted at 108. The one interval impulse driving to the oposite extreme position is accomplished at 110, and the immediate return to the initial extreme is as shown at 112. However, the inability to maintain a DC level results in the beginning of another decline to the mean position as shown at 114.

Upon playback, as depicted in FIG. 6A, the initial slow decline 108 produces a small rate of change signal 116. The excursion 110, since it is only from the mean position to an extreme, produces a half amplitude pulse 118. The return 112 produces a full pulse 120 and the slow decline 114 produces a small amplitude signal 122. It can be seen that the slicing levels 124 must be readjusted to detect the half pulse 118, and that a 6 db loss in signal-to-noise ratio has resulted.

Figures 7, 11:
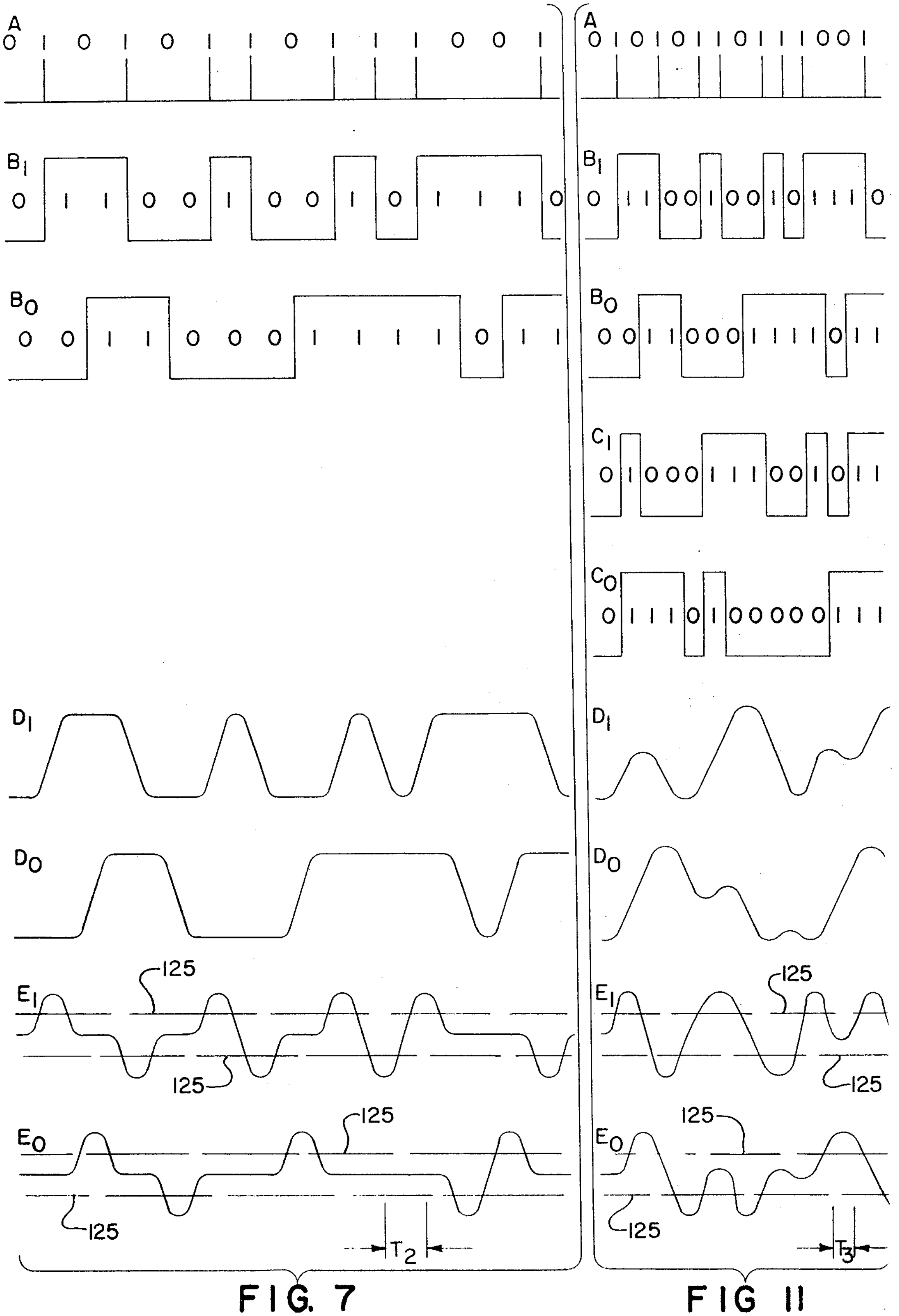
FIG. 7 shows an extended fragmentary view of the binary signal waveforms of FIG. 3 under conditions of higher density recording.
FIG. 11 illustrates enlarged fragmentary views of the binary signal waveforms in another embodiment of the present invention.

As the data rate is increased to approach the bandwidth limits of the system, the groove wall undulations take on the sinusoidal shapes illustrated in FIG. 7. A typical input data stream is shown at FIG. 7A. The NRZ1 signal resulting is shown in FIG. $7B_1$ and the complementary NRZO signal at FIG. $7B_0$. The groove undulations inscribed in the stereo groove for the two channels are shown at FIG. $7D_1$ and $7D_0$ respectively. The cartridge output signals at play-back are illustrated in FIG. $7E_1$ and $7E_0$ respectively as alternating positive and negative sinusoidal pulses. FIG. $7E_1$ is a reproduction of the initial input at FIG. 7A, and FIG. $7E_0$ is a complement of FIG. 7A.

The storage and recovery of data by the methods of this invention compare very favorably to other means, as for example to magnetic tape, as can be demonstrated by considering a numerical example. From the well established technology of music and voice recording it is conservatively within the state of the art to record and reproduce on stereo channels frequencies ranging up to 10 khz using turntable rotational velocities of 45 rpm, with a diminishing rolloff of signal levels up to 15 to 16 khz. The following example is presented in illustration of the present invention and not in limitation thereof.

EXAMPLE I

For a 7 inch disk, consider the outermost groove with a diameter of 6.625 inches, where the conditions are least severe. The circumferential length of one turn is $\pi \times 6.625$ inches or approximately 20.8 inches. At 45 rpm the linear velocity is approximately 15.6 in./sec. The spatial period for a 15.6 khz sinusoid is, $$\text{Period} = (15.6 \text{ in./sec.})/15.6 \text{ kilo-cycle/sec.}) = 0.001 \text{ in./cycle}$$

Data can be recorded at rates of one bit per cycle of bandwidth, or in this example at a density of 1/(0.001 in./cycle) or about 1,000 bits/linear inch.

The above storage rate compares favorably with magnetic tape where bit densities of 800 bits/inch are now standard. The play-back bit rate of 15,600 bits/sec. is of the same order of magnitude as that of magnetic tape systems, and two orders of magnitude faster than a channel recorded on punched paper tape.

In area storage density the grooved disk considerably surpasses magnetic tape because of the lateral confinement inherent in a grooved medium. A pitch of 333 turns/inch for a disk is very conservatively within the state of the art. Magnetic tape systems now use ½ inch wide tape to handle 9 channels. The comparative figures for lateral densities therefore are 333 channels per inch for the disk versus 18 channels per inch for magnetic tape.

The two storage media can be expected to be supplementary in their usage, however. Tape has the great advantage of a write-on capability, where a disk is a read-only storage means. Tape can be re-used many times. On the other hand the disk can be replicated in large volume at low cost, can be stored indefinitely without degradation, and is readily used on simple and inexpensive apparatus.

A disk is customarily recorded upon and played-back at a constant rotational velocity so as to use simple turntable mechanisms. For this reason the spatial frequencies are the lowest in the outside groove, and the highest in the innermost groove. On a 7 inch diameter disk the range is almost 2 to 1. Using the numbers of the example just given, data recorded at a linear density of 1,000 bits/in. in a groove of 20.8 in./turn, produces a one turn capacity of 20,800 bits. At a pitch of 333 grooves/in. it is typical to cut approximately 500 turns. Such a 7 inch disk would then have a storage capacity of 10,400,000 bits.

It is possible to double the above disk storage capacity by going from binary or 2-level recording to 3-level or 4-level recording, thereby achieving data storage densities of 2 bits per cycle of bandwidth. The numerous advantages of recording NRZ1 and NRZO complementary forms on the stereo track pair are retained, capacity is doubled for the same disk parameters, and little additional equipment complexity is required. The price paid is a 6db. loss in signal-to-noise ratio and a controlled degree of interference between signals in adjacent time intervals. Both of these penalties are entirely tolerable in practice.

Methods and means for accomplishing this improvement in storage capacity are disclosed in a second preferred embodiment of this invention. This embodiment employs the concepts of prerecording signal encoding and three-level recording. The prerecording process is illustrated schematically in FIG. 8.

The first step in the process is to encode the incoming data to a new binary form where each bit value is dependent upon the value of one or more preceeding bits known as correlative level coding. The span of bits over which this correlation is to be performed is one less than the number of discrete signal levels to be used in the recording. In the first embodiment of this invention, for example, only two signal levels are used, and the correlation span is 2 minus 1, or one bit. Obviously, this represents a limiting case where there is no correlation with previous bits, and no data compression is possible.

In the second embodiment of this invention, three signal levels are used, so the correlative span is 2 bits. Each bit, therefore, is to be coded to a new form dependent upon the value of the preceeding bit. Let the incoming binary data be a stream of bits of the value $a_1$, $a_2$, $a_3$,.........$a_m$. These bits are to be encoded to a new form of the value $b_1$, $b_2$, $b_3$,.........$b_m$. Each bit, $a_m$ or $b_m$, can be either a one of a zero. The encoding is accomplished by performing a modulo-two addition (carries disregarded) so that, $$b_m = a_m + b_{m-1}$$

It is clear from this expression that if $a_m = 0$, then $b_m = b_{m-1}$. If $a_m = 1$, $b_m$ changes to the value complementary to that of $b_{m-1}$, eg. $b_m = 1$ if $b_{m-1} = 0$, or $b_m = 0$ if $b_{m-1} = 1$. It can be seen that this encoding process is exactly equivalent to signal conversion to an NRZ1 format.

Figure 9:
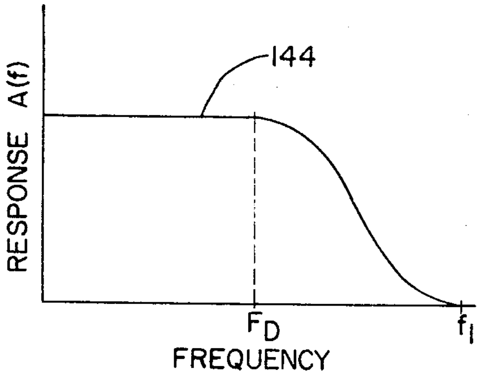
FIG. 9 illustrates the response characteristics of an LP filter employed in a data storage system embodying the invention.

The second step is that of forcing a 3-level form. This function can be performed by a Low Pass Filter of appropriate characteristics as illustrated at curve 144 in FIG. 9, or alternatively by the digital means illustrated in FIG. 10. The Low Pass Filter whose response characteristic is illustrated in FIG. 9 has a typical cosine characteristic roll-off, and cuts off to zero at frequency $f_1$ where $2f_1$ is the inverse of the timing interval T. The filter constrains the frequency spectrum in the 3-level system into one half the bandwidth employed in the equivalent 2-level system. If the 2-level system were so constrained, a hopeless level of inter-symbol interference would result, but as will be shown later this bandwidth constraint is usable by the 3-level system and doubles the data storage capacity of said 3-level system.

Figure 10:
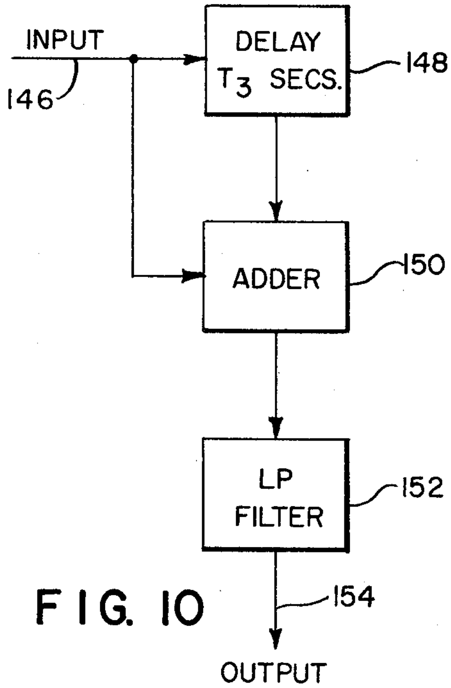
FIG. 10 shows a block diagram of an adder-delay circuit alternative to the filter of FIG. 9

Alternatively, the level conversion process can be accomplished by the digital circuit means illustrated in FIG. 10. The data input on Line 146 is divided into two paths, one going directly to Adder 150, and the second going to a Delay circuit 148. In the latter path the signal is delayed one timing interval, and then introduced to Adder 150 where it is added to its undelayed self. The sum signal resulting is filtered in LP Filter 152 to remove undesired high frequency components and then output on Line 154.

Figure 8:
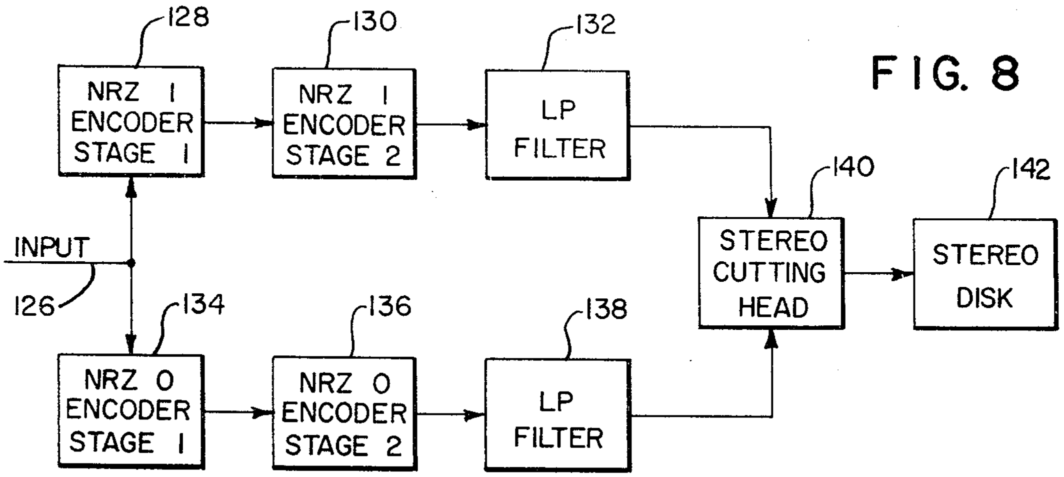
FIG. 8 is a block schematic of another data recording system embodying the invention.

The 3-level embodiment of the invention is shown in block schematic form in FIG. 8. The signal forms are shown at several stages of the system of FIG. 8 in related FIG. 11. The input data is received on Line 126 and is illustrated in conventional pulse form in FIG. 11A. It is then divided into the parallel complementary channels. On the upper path it is encoded to the NRZ1 format in NRZ1 Encoder Stage 1, 128 and on the lower path to the NRZO format in NRZO Encoder Stage 1, 134. The output signal forms resulting from these encodings are shown respectively at 11$B_1$, and 11$B_o$. Oftentimes the data will be received already encoded in NRZ1 format, and in that case the NRZ1 Encoder 128 is simply omitted, and the upper signal path can lead directly to NRZ1 Encoder, Stage 2, 130. In the lower path it would then be necessary to decode from NRZ1 format and recode to NRZO.

The two paths next lead to a second stage of Encoders 130 and 136 where the function of correlation over two timing intervals is performed. As was discussed earlier in this disclosure, these Encoders 130 them. 136 become simply a second stage of NRZ1 and NRZO encoders identical to the Encoder 128 and 134 preceeding hem. The output signal forms from Encoders 130 and 136 are shown at 11$C_1$ and 11$C_o$ respectively. Identical Low Pass Filters 132 and 138, as described earlier, compress the two signals into narrower frequency bands producing the waveforms shown at 11$D_1$ and 11$D_o$, respectively. These two signals are then input to Stereo Cutting Head 140 and are cut into the stereo channels of the groove of Disk 142. Direct coupling may be used so that the DC component is preserved, and the constant displacement characteristic is employed. The groove undulations, therefore, have the identical contours as in 11$D_1$ and 11$D_o$.

The play-back system is identical to that illustrated in FIG. 5, differing only in certain details of component values so as to accommodate different signal levels and frequencies. The signal out of the upper channel appearing at the terminals of Stereo Cartridge 62 in FIG. 5 is shown in FIG. 11 $E_1$, and that of the lower channel in FIG. 11 $E_o$. After full wave rectification to invert the negative pulses and slicing to levels 125, it can be seen that the original data input, as at 11A, has been reconstituted identically at 11$E_1$, and in complementary form at 11$E_o$.

The 3-level system just described and illustrated in the Figures referred to achieves correlative level coding of binary data and thereby permits recording and play-back of 2 bits per cycle of bandwidth, double the storage density of the 2-level system described earlier in this disclosure. This characteristic is illustrated in FIG. 11 in the side by side depicting of comparative signal forms for the 2-level system shown in FIG. 11.

Identical data inputs are shown at 7A and 11A for both systems. The date time interval $T_3$ in FIG. 11 is half the data time interval $T_2$ in FIG. 7. At 7$B_1$ and 11$B_1$ are shown the identical results of encoding to NRZ1 format in both systems, and at 7$B_o$ and 11$B_o$ the corresponding encoding to NRZO. At 11$C_1$ and 11$C_o$ the results of a second stage of NRZ1 and NRZO encoding for the 3-level system are shown. The second stage of encoding is not employed in the 2-level system. The respective contours of the V-groove cut into the disk are shown at 7D, 7$D_o$, 11$D_1$, and 11$D_o$, and the resulting outputs from the cartridge at play-back are shown at 7$E_1$, 7$E_o$, 11$E_1$, and 11$E_o$. It can be seen that 7$E_1$, and 11$E_1$ are reproductions, and 7$E_o$ and 11$E_o$ are inversions of the original input data signal at 7A and 11A.

Inspection of these curves shows that in spite of the double data rate for the 3-level system of FIG. 11, the periodicity of the undulations of the V-groove for the 3-level case are comparable to the 2-level case, and the data has been successfully stored and recovered.

Thus, comparison of FIGS. 7 and 11 particularly 7$D_1$, 7$D_o$, and 11$D_1$, 11$D_o$, readily show that the 3-level embodiment of the invention stores the same amount of data in half the groove length as does the 2-level embodiment of the invention. That is, the 3-level embodiment provides a data storage capacity in a grooved medium that can be double the capacity of the 2-level embodiment herein. Since the enscribed curves in the 3-level system, eg. FIG. 11$D_1$, and 11$D_o$ are comparable in rate of curvature as compared with the corresponding curves in the FIG. 7$D_1$, 7$D_o$, even though the timing interval $T_3$ is one half $T_2$, the data signal of the 3-level system curves can be inscribed or cut into a record groove one half the distance of the two level system curves along said record groove without encounting excessive intersymbol distortion. Hence, increased data storage capacity is achieved.

It is worthy of note at this point that the frequency band limitations of the two storage systems described herein are established by the mechanical and electromechanical elements of the systems, ie. the cutting and playback stylii and transducers, tracing error limitations, and the like. Since the storage system is integral within itself there is considerable latitude in the availability of band width in the purely electrical systems pre-ceeding the Stereo Cutting Head and following the playback stylus and Stereo Cartridge.

The performance levels of the two embodiments of the invention can be illustrated by extending the numerical example given earlier for the 2-level system as summarized in the following table.

The figures chosen are for purposes of illustration only and should not be construed in limitation of the present invention.

TABLE I

| | 2Level | 3-Level |
|---|---|---|
| Density of data storage on the outer groove of a 7" disk | 1000 bits/in. | 2000 bits/in. |
| Storage capacity per turn | 20,800 bits | 41,600 bits |
| Storage capacity of one side of a 7" disk with 500 turn spiral | 10,400,000 bits | 20,800,000 bits |
| Signal-to-Noise Ratio | Reference | 6db poorer |

It will be recognized that various data signal combinations can be inscribed in a data storage medium within the scope of the present invention. For example, NRZ, NRZ plus a clocking signal, NRZO, NRZO plus a clock signal, NRZ1, NRZ1 plus a clock signal, NRZ1 and NRZO, double encoded NRZ1, double encoded NRZ1 plus clock signal, double encoded NRZO, double encoded NRZO plus a clock signal, double encoded NRZ1 and double encoded NRZO. Other signal combinations will be apparent within the scope of the present invention. The above data signals can be inscribed in a monaural or stereo storage medium. However, a stereo medium is preferred particularly where a plurality of signals is being recorded due to the self clocking and error detection features. The self clocking feature, in particular, permits efficient utilization of the disk entirely for data storage with the resulting benefits of larger storage capacity thereof.

What is claimed is:

1. A method for storing digital data on a record medium recoverable by velocity-sensitive transducers comprising, converting said digital data to a baseband electrical signal of the form of a plurality of amplitude levels (each of which is) with the transitions between levels assigned a logical data significance and inscribing said signal, including any significant direct current and low frequency components thereof, onto said record medium as an undulating groove having lateral displacements along at least one axis normal to the general path of the groove where said displacements correspond to the amplitude levels of said electrical signal, said transitions between displacements being recoverable by said velocity-sensitive transducers.

2. The method of claim 1 wherein the number of said amplitude levels is two.

3. The method of claim 1 wherein the number of said amplitude levels is three.

4. The method of claim 1 wherein said baseband signal has 3 amplitude levels and wherein the signal data rate is sufficiently high in relation to the system bandwidth that the time response of said system to the data rate of said signal which is to be stored is limited so that only one step of signal level change can be accomplished in each data bit time interval, and two time intervals carrying successive logical data elements of the same value are required to permit a change from one extreme amplitude level to the opposite extreme amplitude level.

5. The method of claim 1 wherein said baseband signal has 3 amplitude levels and one of said amplitude levels is inscribed as a lateral displacement of the incsribed groove to a maximum displacement position, a second amplitude level is inscribed as a lateral displacement of the inscribed groove to the opposite maximum displacement position, and a third amplitude level is inscribed as a near zero displacement proximate the mean lateral position of the inscribed groove.

6. The method of claim 1 wherein said baseband signal has 2 amplitude levels and one of said amplitude levels is inscribed as a lateral displacement of the inscribed groove to a maximum displacement position, and the second amplitude level is inscribed as a lateral displacement of the inscribed groove to the opposite maximum displacement position.

7. The method of claim 1 wherein said digital data is converted to an electrical signal of the NRZ1 form wherein a logical One is represented by a change of the opposite of 2 levels, and a logical Zero is represented by no change of levels.

8. The method of claim 1 wherein said digital data is converted to an electrical signal of the NRZO form whereby a logical Zero is represented by a change to the opposite of 2 levels, and a logical One is represented by no change of levels.

9. The method of claim 1 wherein a clock signal is inscribed on the recording medium in conjunction with the data signal.

10. Apparatus for storing digital data on a data storage medium comprising receiving means for said digital data;

a first stage NRZ1 encoding means for converting said data to an NRZ1 electrical signal.

a second stage NRZ1 encoding means for further encoding said NRZ1 signal to a double encoded NRZ1 signal.

a first stage NRZO encoding means for converting said data to an NRZO electrical signal.

a second stage NRZO encoding means for converting said NRZO signal to a double encoded NRZO signal.

low pass filter means for compressing each of said double encoded signals into narrower frequency bands.

means for imposing said double encoded NRZ1 signal and said double encoded NRZO signal upon the separate and orthogonally related channel circuits of a stereo groove cutting head and means for relatively moving said cutting head in contact with said data storage medium to simultaneously inscribe said NRZ1 and NRZO double encoded signals into said storage medium as a stereo groove therein.

11. A method for storing digital data on a record medium recoverable by velocity-sensitive transducers comprising, converting said digital data into a pair of baseband electrical signals having a plurality of amplitude levels with the transition between levels assigned a logical data significance one signal of the pair being encoded to the NRZ1 signal and the second signal of the pair being encoded to the complementary NRZO signal and inscribing the NRZ1 signal into one channel of a stereo groove of a record medium and inscribing the NRZO signal into the other channel of said stereo groove, the pair of said signals being inscribed as clocking complements of each other, said transitions between displacements being recoverable by said velocity-sensitive transducers.

12. The method of claim 11 wherein said NRZ1 and said NRZO electrical signals are inscribed in their respective channels as an undulating groove having displacements along a pair of orthogonally related axes corresponding to variations in their respective data streams.

13. The method of claim 11 wherein the number of said amplitude levels is 2.

14. A method for storing digital data on a record medium recoverable by velocity-sensitive transducers comprising, converting said digital data into an electrical signal, first stage encoding said signal into a 2-level NRZO signal, second stage encoding said NRZO signal into a double encoded 2-level NRZO signal, increasing the data density of said double encoded NRZO signal to obtain 3-level data density therein and inscribing said 3-level signal onto said storage medium.

15. A method for storing digital data on a record medium recoverable by velocity-sensitive transducers comprising, converting said digital data into an electrical signal, first stage encoding said signal into a 2-level NRZ1 signal, second stage encoding said NRZ1 signal into a double encoded 2-level NRZ1 signal, increasing the data density of said double encoded NRZ1 signal to obtain 3-level data density therein and inscribing said 3-level signal onto said storage medium.

16. The method of claim 15 wherein the NRZ1 signal after the first stage encoding has the amplitude values of $a_1$, $a_2$, $a_3$, .....$a_m$ representing a series of $m$ data time intervals, and said second NRZ1 signal after the second stage encoding has the amplitude values $b_1$, $b_2$, $b_3$,.....$b_m$, where $b_m = a_m + b_{m-1}$.

17. Apparatus for storing digital data on a record medium comprising receiving means for said digital data:

a first encoding means for converting said data to an NRZ1 electrical signal:

a second encoding means for converting said data to an NRZO electrical signal:

means for imposing said NRZ1 signal and said NRZO signal upon the separate and orthogonally related channel circuits of a stereo groove cutting head and means for relatively moving said cutting head in contact with said record medium to simultaneously inscribe said NRZ1 and NRZO signals into said record medium as a stereo groove therein.

18. A method for storing digital data on a record medium in a form recoverable by velocity-sensitive transducers comprising, converting digital data into a series of signals, first stage encoding said series into an NRZO data signal and a complementary NRZ1 data signal to obtain 2-level data density, second stage encoding said NRZO data signal to a double encoded NRZO data signal and said NRZ1 data signal to a double encoded NRZ1 data signal, limiting the system bandwith of said double encoded data stream signals to restrict each signal to three amplitude levels and inscribing said double encoded data streams onto a stereo record medium as clocking complements of each other.

19. The method of claim 18 wherein said double encoded NRZO data signal is inscribed onto one channel of a stereo groove of a recording medium and said double encoded NRZ1 data signal is simultaneously inscribed onto the other channel of said groove, said data signals being inscribed as clocking complements of each other.

20. The method of claim 18 wherein the data storage density of said double encoded data streams is increased by directing each of said data signals along separate paths, one path leading to an adding means, the other path leading to a delay circuit delaying said data signal one timing interval T, the delayed signal then being directed to said adding means where said delayed data signal is added to the undelayed data signal to obtain conversion to 3-level data storage.

21. The method of claim 18 wherein the data density density of said double encoded data stream is increased by passing each of said data streams through a low pass filter to compress said data stream to a reduced bandwidth so that the signal requires two data time intervals to change from one extreme level to the opposite extreme to obtain said 3-level data density.

22. A method of storing digital data comprising first stage encoding a series of data signals into an NR20 data signal and a complementary NR21 data signal to obtain 2-level density at the data rate of 1 bit per cycle of bandwidth, second stage encoding said NRZO data signal to a double encoded NRZO data signal and said NRZ1 data signal to a double encoded NR21 data signal, increasing the data storage density of said double encoded data signals to 2 bits per cycle of bandwidth to obtain 3-level data density therein and inscribing said double encoded data signals onto a data density medium as clocking complements of each other.

23. The method of claim 22 wherein the system bandwidth is essentially 16 kilohertz at cut-off and the digital data is stored at densities permitting data rates of 32 kilobits per second.

24. A method for recording and recovering digital data comprising, converting said digital data into a series of electrical signals, encoding said series of signals into a form selected from the group consisting of NRZ, NRZ0, NRZ1, double encoded NRZO, and double encoded NRZ1, inscribing said data stream on a record medium as an undulating groove having lateral displacements according to variations in said data stream, and recovering said digital data by tracking the inscribed groove with a stylus coupled to a transducer to convert the transitions between groove displacements to variations in an electrical signal and reading said signal at at least one selected ampliture level and at intervals T to obtain at each interval a binary digit being a logical One when said signal is above said level and a logical Zero when said signal is below said level.

25. The method of claim 24 wherein the said selected signal form is inscribed on one channel of a stereo groove, and the complementary signal form is recorded on the second channel of the stereo groove.

26. The method of claim 24 wherein said data stream signal and a clock signal are both inscribed in said record medium and the electrical signal from said transducer passed through a filter to separate said clock signal providing a time basis for said intervals T.

27. A method for recording and recovering digital data comprising converting digital data into a series of electrical signals, encoding said series of signals into an NR20 data signal and complementary NR21 data signal inscribing said NR20 data signal into one channel of a stereo groove of a record medium and simultaneously inscribing said NR21 data signal into the other channel of said stereo groove and recovering said digital data by tracking the inscribed groove with a stereo stylus to generate two output electrical signals, one output electrical signal for said NR20 data signal and another output electrical signal for said NR21 data signal and reading one of said output electrical signals, at intervals T to reconstitute and recover the original digital data.

28. The method of claim 27 wherein the NR20 output electrical signal and the NR21 output electrical signal are read together to syncronize a clock and obtain an accurate clock signal to define a time basis for said intervals T, applying said clock signal to one of said output electrical signals and reading the so clocked output electrical signal at said intervals to recover the original digital data.

29. The method of claim 27 wherein the recovered signal in each of the stereo channels is subjected to full wave rectification to make data streams in each channel of single polarity pulses and spaces, reading said signals by observing pulses in each time interval that appear above a slicing threshold of approximately 50 percent of the maximum signal level, feeding the two pulse streams through isolating diodes to then combine the two streams to provide a pulse in all timing intervals, using said constant stream of pulses to synchronize an accurate clock, combining a clock signal from said clock with one of said pulse streams and reading the pulse stream at the so clocked intervals to reconstitute and recover the original digital data.

30. The method of claim 27 wherein error in data storage and recovery is applied to said output electrical signals by converting said output electrical signals to pulse streams by slicing said signals at a selected threshold, comparing simultaneously the two pulse streams at each interval T, observing whether there is at any interval the occurrence of simultaneous pulses or no pulse at all in the two pulse streams, in which cases error is detected and reporting any detected error.

31. The method of claim 27 wherein said NR21 signal and said NR20 signal are second stage encoded to a double encoded NR21 signal and a double encoded NR20 signal and said double encoded signals are inscribed in the two channels of a stereo-groove and thereafter recovered as output electrical signals, said output signals being read together to syncronize a clock and reading one of said output signals against said syncronized clock to recover the original digital data.

32. A medium for storing digital data comprising a record disk having undulating groove inscribed therein, said groove having lateral displacements according to variations in an encoded data signal, said encoded signal being obtained from a series of electrical signals by conversion of digital data, said encoded data signal being a signal selected from the group consisting of NR20, NR21, double encoded NRZO and double encoded NRZ1.

33. The storage medium of claim 32 wherein said groove has as an inscribed component, a clock signal therefor, said component being a superimposed sinusoidal wave having a period of ½ T.

34. The record disk of claim 32 having a stereo groove inscribed therein wherein an NRZO data stream signal and an NRZ1 data stream signal are inscribed in the respective channels thereof as an undulating groove having displacements along a pair of orthagonally related axes corresponding to variations in their respective signals.

35. The record disk of claim 32 having a storage capacity of at least 1,000 bits per linear inch.

* * * * *